United States Patent [19]

Bauer et al.

[11] Patent Number: 5,025,465
[45] Date of Patent: Jun. 18, 1991

[54] X-RAY CASSETTE FOR FOILS WITH PHOSPHOR LAYER

[75] Inventors: Walter Bauer; Roland Müller, both of Muenchen, Fed. Rep. of Germany

[73] Assignee: Agfa-Gevaert Ag, Leverkusen, Fed. Rep. of Germany

[21] Appl. No.: 429,354

[22] Filed: Oct. 31, 1989

[30] Foreign Application Priority Data

Nov. 15, 1988 [DE] Fed. Rep. of Germany ....... 8814270

[51] Int. Cl.$^5$ ...................... G03B 42/02; G03B 42/04; G03B 5/16
[52] U.S. Cl. .................... 378/169; 378/181; 378/188; 378/187; 250/327.2
[58] Field of Search ............... 378/181, 169, 187, 188, 378/182, 185; 250/327.2 A, 327.2 B, 327.2 J, 484.1 B

[56] References Cited

U.S. PATENT DOCUMENTS

| | | | |
|---|---|---|---|
| 4,166,958 | 9/1979 | Haselbarth | 378/188 |
| 4,339,038 | 7/1982 | Bauer | 378/188 |
| 4,575,635 | 3/1986 | Arakawa et al. | 250/484.1 B |
| 4,637,043 | 1/1987 | Bauer | 378/182 |
| 4,835,396 | 5/1989 | Kitada et al. | 250/486.1 |

FOREIGN PATENT DOCUMENTS 3535981  3/1981  Fed. Rep. of Germany ........ 37/188

OTHER PUBLICATIONS

Tamura, European Patent Appl., 0 108 982, filed 28 Oct. 1983.
Tamura, European Patent Appl., 0 115 802, filed 20 Jan. 1984.
Tamura, European Patent Appl., 0 158 942, filed 4 Apr. 1985.

Primary Examiner—Edward P. Westin
Assistant Examiner—Don Wong
Attorney, Agent, or Firm—Michael J. Striker

[57] ABSTRACT

An X-ray cassette for foils provided with a stimulatable phosphorous layer comprises two cassette parts turnable relative to one another between open and closed positions, one of the cassette parts being permeable for X-rays, elements for turnably connecting the cassette parts with one another, and elements for holding a foil on the X-ray permeable cassette part, the holding elements including an X-ray permeable elastic pad arranged on the X-ray permeable cassette part and having a surface facing toward a phosphorous layer of a foil inserted into the cassette, and a thin elastic foil applied on the surface of the pad and having a smooth, wear-resistant outer surface.

17 Claims, 1 Drawing Sheet

U.S. Patent
June 18, 1991
5,025,465
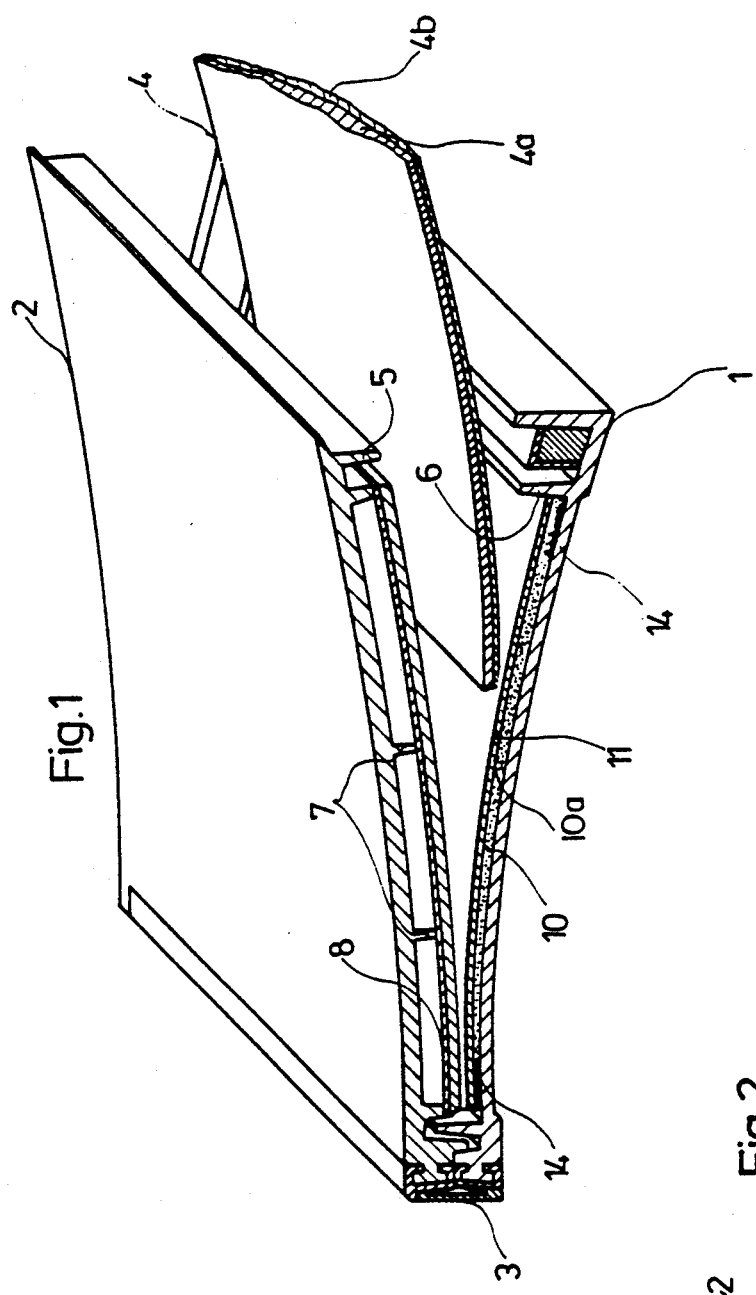
Fig.1
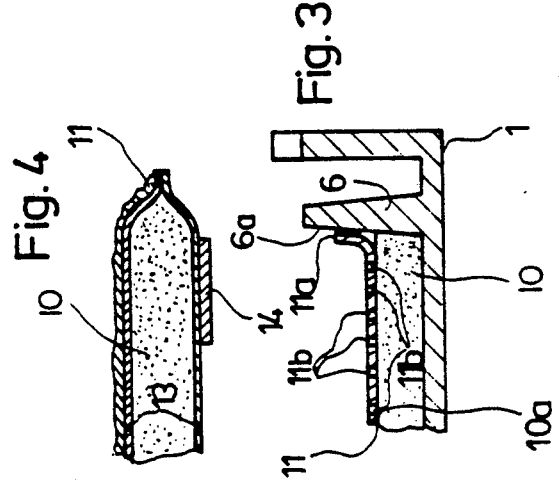
Fig.2
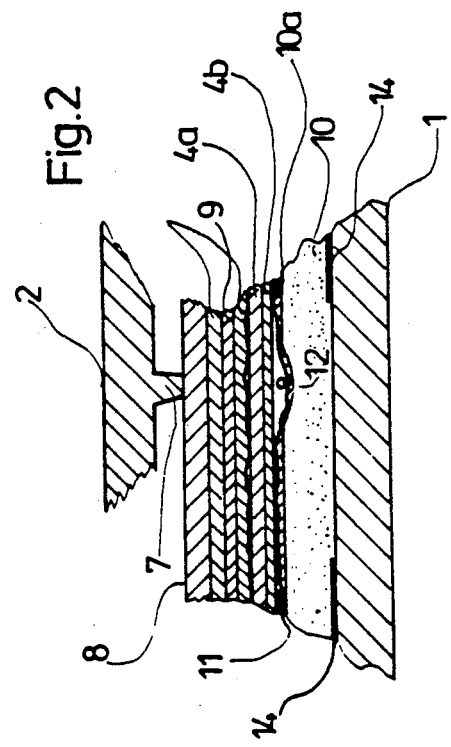
Fig.3
Fig.4

X-RAY CASSETTE FOR FOILS WITH PHOSPHOR LAYER

BACKGROUND OF THE INVENTION

The present invention relates to an X-ray cassette for receiving foils with a stimulable phosphor layer. More particularly, it relates to such cassette which has two cassette parts, including at least one cassette part permeable for X-rays, a hinge connecting in the cassette parts with one another, a lock for releasably locking both cassette parts, labyrinth-like light sealing elements between the cassette parts, and elements for holding the foil on the inner side of the X-ray permeable cassette part.

Cassettes of the above mentioned general type are known in the art. Some of such cassettes are disclosed in the patent documents EP 01 08 982 A2, EP 01 58 942 A1 and EP 01 15 802 A2. The German Patent Document DE 35 35 981 C2 also discloses a similar cassette, however for conventional X-ray films. In these known cassettes the foam material plates with different surfaces serve as pressing means for the stimulable phosphor foil. The X-ray permeable cassette parts art is coated in the known cassettes with a material which has a high nap such as for example velvet. Thereby the sensitive stimulable phosphor layer can be protected from mechanical actions, such as wear and scratching for increasing its service life. For preventing a retention of the phosphor foil during removal, many of these cassettes are provided with recesses in the nap and/or in the pressing element. In these known cassettes, the nap is compressed after a certain time, so that its function is no longer efficient. Moreover, the nap can cause a certain wear of the phosphor layer.

SUMMARY OF THE INVENTION

Accordingly, it is an object of the present invention to provide an X-ray cassette of the above mentioned general type which avoids the disadvantages of the prior art.

More particularly, it is an object of the present invention to provide an X-ray cassette of the above mentioned type, which is formed so that the phosphor layer during insertion into the cassette and withdrawal from the cassette is protected.

In keeping with these objects and with others which will become apparent hereinafter, one feature of the present invention resides, briefly stated, in an X-ray cassette in which the X-ray permeable cassette part is provided with an X-ray permeable elastic pad with a thin elastic foil of a smooth, wear-resistant material on its surface which faces toward the phosphor layer and the cassette interior.

When the cassette is designed in accordance with the present invention it avoids the disadvantages of the prior art and provides for the above mentioned advantageous results.

The smooth, wear-resistant protective foil considerably reduces the friction forces acting on the phosphor layer.

In accordance with another feature of the present invention, the surface of the layer has a spatial structure without edges and tips.

It is still a further feature of the present invention that the protective foil is formed as a polyester foil with a thickness of approximately 0.02 mm, and the pad is composed of a foam or felt.

In accordance with a further feature of the present invention, the pad is glued on the X-ray permeable cassette part.

Still a further feature of the present invention is that the pad is glued in the X-ray permeable cassette part by means of a double-side adhesive band.

The protective foil can be attached to the pad by glueing or hot sealing process.

The pad can be provided with an outer layer on its both sides, and the protective foil can be applied on the outer layer, whereupon the protective foil, the outer layer and the pad are welded along their edges.

Still another feature of the present invention is that the outer surface of the protective foil can be provided with fine throughgoing openings.

Finally a lead plate coated with a synthetic plastic material is provided on the inner side of the opposite cassette part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective partially sectioned view of an X-ray film cassette in accordance with the present invention;

FIG. 2 is a view showing an enlarged part of the cutting surface of FIG. 1 in a closed condition;

FIG. 3 is a view showing a section through a part of another embodiment of the present invention;

FIG. 4 is a section through a part of a further embodiment of the present invention.

DESCRIPTION OF THE PREFERRED EMBODIMENTS

An X-ray cassette described hereinbelow is embodied as an example in a cassette which is used in diagnostic imaging systems. The cassette includes a cassette part 1 which is permeable for X-rays and a cassette part 2 which forms a cover of the cassette.

The cassette parts 1 and 2 are connected turnably with one another by means of a hinge 3. They can be releasably closed by a lock which is not shown in the drawings. The field for a stimulable phosphor foil 4 to be introduced into the cassette is limited by labyrinth ribs 5 and 6 in both cassette parts 1 and 2. They serve for providing light tightness in the closed condition of the cassette.

The cassette part 2 which forms the cover of the cassette has inwardly shaped reinforcing ribs 7 provided on its flat side. The reinforcing ribs 7 are welded or glued with a further synthetic plastic plate 8. A lead plate 9 is glued with the synthetic plastic plate 8 and welded with a foil 9a. The lead plate 9 holds a phosphor foil 4 stimulable with X-ray radiation in a flat position. The lead plate 9 first of all prevents the exit of the X-rays out of the cassette part 2. The foil 9a which surrounds the lead plate 9 at its side facing toward the phosphorous foil 4 can have a spatial structure without edges and tips. This structure prevents an eventual adherence of the phosphor foil 4 to the cassette part 2.

A pad 10 is inserted in the inner side of the cassette part 1 which is permeable for X-rays. The pad 10 is also permeable to X-rays. At its side 10a which faces the phosphor layer 4b, the pad 10 is provided with a thin, wear-resistant, smooth protective foil 11. The outer surface of the foil 11 can have a spatial structure without tips and edges, for example a wave-shape. Due to the high sliding properties of the protective foil 11 and its wear-resistance, the phosphor layer 4b during loading-in and unloading from the cassette 1, 2 is not subjected to mechanical loads and scrapping. The pad 10 is composed of a soft material, for example a soft foam material. Due to the softness of the pad 10 and the softness of the smooth protective foil 11, eventually accumulated dust grains or particles 12 press into the protective foil 11, and the foam material of the pad 10. Therefore, the phosphor layer 4b is not scraped, as can be seen in FIG. 2.

FIG. 3 shows the protective foil 11 which as in FIG. 2 is applied directly on the pad 10. However, the protective foil 11 at their edges 11a is glued to a peripherally extending labyrinth rib 6a of the cassette part 1. The protective foil is provided with a fine perforation network 11b instead of an upper surface structure. The air can therefore escape from the foam material pad 10 through the perforations. As a result, the release of the phosphor foil 4 is facilitated.

FIG. 4 shows a pad 10 which is welded around it. The pad 10 is surrounded by an outer layer 13. The protective foil 11 is connected with the outer layer 13 by welding or glueing.

The pad 10 can be attached to the inner side of the X-ray permeable cassette part 1 by means of a double-side adhesive band 14. It is to be understood that also a surface adhesive connection is possible as well.

It will be understood that each of the elements described above, or two or more together, may also find a useful application in other types of constructions differing from the types described above.

While the invention has been illustrated and described as embodied in an X-ray cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An X-ray cassette for foils provided with a stimulable phosphor layer, comprising two cassette parts turnable relative to one another between open and closed positions, one of said cassette parts being permeable for X-rays; means for turnably connecting said cassette parts with one another; means for holding a foil on said X-ray permeable cassette part, said holding means including an X-ray permeable elastic pad arranged on said X-ray permeable cassette part and having a surface facing toward a phosphor layer of a foil inserted into the cassette; and means for protecting the phosphor layer of the foil from mechanical loads and scrapping and including an elastic protective foil applied on said surface of said elastic pad, facing toward the phosphor layer, and having a smooth, wear-resistant outer surface.

2. An X-ray cassette as defined in claim 1; and further comprising means for locking said cassette parts in said closed position.

3. An X-ray cassette as defined in claim 1; and further comprising sealing means including labyrinth-like sealing elements provided between said cassette parts.

4. An X-ray cassette as defined in claim 1, wherein said outer surface of said elastic protective foil has an spatial structure without edges and tips.

5. An X-ray cassette as defined in claim 1, wherein said elastic protective foil is composed of polyester.

6. An X-ray cassette as defined in claim 5, wherein said elastic protective foil has a thickness of substantially 0.02 mm.

7. An X-ray cassette as defined in claim 1, wherein said elastic pad is composed of a foam material.

8. An X-ray cassette as defined in claim 1, wherein said elastic pad is composed of felt.

9. An X-ray cassette as defined in claim 1; and further comprising means for connecting said elastic pad with said X-ray permeable cassette part and including an adhesive.

10. An X-ray cassette as defined in claim 9, wherein said adhesive is formed as a double-sided adhesive band.

11. An X-ray cassette as defined in claim 1; and further comprising means for connecting said protective foil with said elastic pad and including an adhesive.

12. An X-ray cassette as defined in claim 1; and further comprising means for connecting said elastic protective foil with said elastic pad and including a hot-seal produced weld.

13. An X-ray cassette as defined in claim 1, wherein said elastic pad has both sides provided with an outer layer, said elastic protective foil being arranged on said outer layer of said elastic pad.

14. An X-ray cassette as defined in claim 13; and further comprising means for connecting said elastic protective foil with said outer layer and with said pad and including welds on their edges.

15. An X-ray cassette as defined in claim 1, wherein said elastic protective foil is provided with a plurality of perforations.

16. An X-ray cassette as defined in claim 1, wherein the other one of said cassette parts is provided with a lead plate.

17. An X-ray cassette as defined in claim 16, wherein said lead plate of said other cassette part is coated with a synthetic plastic material.

* * * * *